United States Patent
Holland

(10) Patent No.: US 9,522,400 B2
(45) Date of Patent: Dec. 20, 2016

(54) DRIVE SYSTEM FOR A BALL MILL AND METHOD FOR OPERATING A BALL MILL

(75) Inventor: Maarten Holland, Poxdorf (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 520 days.

(21) Appl. No.: 14/000,127

(22) PCT Filed: Feb. 7, 2012

(86) PCT No.: PCT/EP2012/052025
§ 371 (c)(1),
(2), (4) Date: Aug. 16, 2013

(87) PCT Pub. No.: WO2012/110358
PCT Pub. Date: Aug. 23, 2012

(65) Prior Publication Data
US 2013/0327859 A1     Dec. 12, 2013

(30) Foreign Application Priority Data
Feb. 18, 2011  (DE) .................... 10 2011 004 416

(51) Int. Cl.
*B02C 25/00* (2006.01)
*B02C 17/24* (2006.01)
(Continued)

(52) U.S. Cl.
CPC ........... *B02C 17/24* (2013.01); *B02C 17/1805* (2013.01); *B02C 25/00* (2013.01); *H02P 1/34* (2013.01); *H02P 25/24* (2013.01)

(58) Field of Classification Search
CPC ...... B02C 17/00; B02C 17/24; B02C 17/1805; B02C 25/00
(Continued)

(56) References Cited

U.S. PATENT DOCUMENTS 7,017,841 B2 * 3/2006 Tirschler ............. B02C 17/1805
241/30
8,276,837 B2 * 10/2012 Becker ................ B02C 17/1805
241/299
(Continued)

FOREIGN PATENT DOCUMENTS

CN        1993182 A      11/2011
DE        2712620 A1      3/1978
(Continued)

OTHER PUBLICATIONS

Riefenstahl, Ulrich: "Elektrische Antriebssysteme—Grundlagen, Komponenten, Regelverfahren, Bewegungssteuerung"; in: Etektrische Antriebssysteme, 2nd edition, Teubner Verlag, Wiesbaden; pp. 51, 136-137, 139; ISBN 3-8351-0029-7; 2006.

*Primary Examiner* — Faye Francis
(74) *Attorney, Agent, or Firm* — Henry M. Feiereisen LLC.

(57) ABSTRACT

A drive system for a ball mill includes a motor with a slip-ring rotor. The motor is assigned a family of characteristics relating the torque of the motor to a further characteristic variable. The family of characteristics has at least two different characteristics, and it includes a switching element that switches over the drive system abruptly between the two characteristics when there is a constant value of the characteristic variable. In a method for operating a ball mill with a drive system, a drum of the ball mill is moved out of a state of rest when the first characteristic is activated. In the event of caking in the drum of the ball mill, the drum is moved until the caking is in an inclined position. Actuation of the switching element brings about switching over to the second characteristic.

10 Claims, 4 Drawing Sheets

(51) Int. Cl.
*B02C 17/18* (2006.01)
*H02P 1/34* (2006.01)
*H02P 25/24* (2006.01)

(58) Field of Classification Search
USPC .................................. 241/36, 170, 176–178
See application file for complete search history.

(56) References Cited

U.S. PATENT DOCUMENTS

2008/0169368 A1* 7/2008 Becker ................ B02C 17/1805
241/30
2011/0283504 A1* 11/2011 Becker ................ B02C 17/1805
29/426.2

FOREIGN PATENT DOCUMENTS

| | | |
|---|---|---|
| DE | 3528409 A1 | 2/1987 |
| DE | 4410959 A1 | 10/1995 |
| DE | 102004015057 A1 | 10/2005 |
| EP | 2347828 A1 | 7/2011 |
| GB | 2011198 A | 7/1979 |
| WO | WO 9516519 A1 | 6/1995 |
| WO | WO 2004079891 A1 | 9/2004 |
| WO | WO 2010049908 A2 | 5/2010 |

* cited by examiner

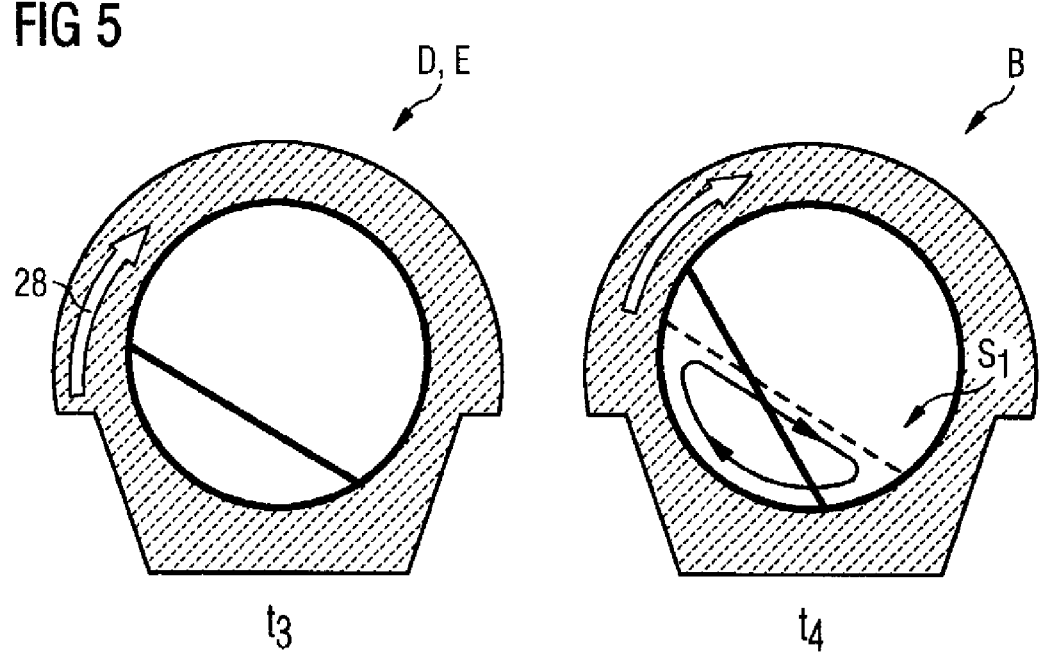

DRIVE SYSTEM FOR A BALL MILL AND METHOD FOR OPERATING A BALL MILL

CROSS-REFERENCES TO RELATED APPLICATIONS

This application is the U.S. National Stage of International Application No. PCT/EP2012/052025, filed Feb. 7, 2012, which designated the United States and has been published as International Publication No. WO 2012/110358 and which claims the priority of German Patent Application, Serial No. 10 2011 004 416.7, filed Feb. 18, 2011, pursuant to 35 U.S.C. 119(a)-(d).

BACKGROUND OF THE INVENTION

The invention relates to a drive system for a ball mill and a method for operating a ball mill.

A ball mill is a device for coarse, fine and ultrafine reduction or homogenization of grinding stock. It comprises a grinding chamber, normally formed by an inner chamber of a drum which can be made to rotate and in which the grinding stock is reduced by means of a grinding medium. Ball mills are used for both wet grinding and dry grinding. In particular, the term ball mill includes rolling mills, drum mills and tube mills. Grinding mediums used in ball mills include not only spherical grinding mediums but also other shapes such as cylindrical grinding mediums, etc.

Ball mills are used for grinding ore in mining operations, for example. In other branches of industry, substances to be ground may include ceramic materials or material mixtures. Ball mills are used in the production of slips in the ceramics industry, for example.

Various drive designs exist for such mills. The use of gearless direct drives in the form of ring motors is known. The operation of a ball mill by means of a slipring motor is simpler and less costly.

When a ball mill is stationary, the material to be ground (though unconsolidated itself) can solidify in the mill. This occurs, for example, if the mill is switched off for some hours or days for the purpose of maintenance. The grinding stock then solidifies and adheres to the inner wall of the drum. Such a situation is referred to as "caking" or "frozen charge". If the drum of the ball mill is made to rotate again after such caking has occurred, nearly all of the material to be ground, including the added grinding medium, remains adhered to the mill wall as a unit in a solid state and is rotated as such from an approximately horizontal position. If the drum of the mill then reaches a critical angle of rotation and the caking therefore reaches a critical inclined position, it is usual for a large part of the caking to suddenly become detached. Due to the considerable mass of the caking that falls, a ball mill can be seriously damaged or even ruined.

In the case of smaller mills, which are normally driven by slipring motors, automatic caking recognition is known, e.g. in the form of a "Mill Safety Start System" from SDG Technologies. However, the caking cannot be dispersed using the known system. In order to disperse such caking, it is usual to add water to the caking and then disperse it, possibly using mechanical means.

The known "Mill Safety Start System" therefore merely allows the "frozen charge" state, i.e. the presence of caking, to be captured or recognized. Switching off the mill likewise takes place automatically. However, the caking must still be detached manually, e.g. by flooding or mechanical means. The mill is then restarted, likewise manually.

DE 10 2004 015 057 A1 discloses a method, particularly for large mills comprising a ring motor, for decompacting caking by means of selectively actuating the motor of the mill. The known method is easy to implement in a mill which features a ring motor, as it consists in merely programming the motor regulator. Unlike slipring motors, a corresponding regulator is already present. Such a method is used in the "Frozen Charge Shaker" product from Siemens, for example. In this context, said method essentially consists in merely programming the regulator of the ring motor, since a corresponding regulator is already present in the system. The system which is known for ring motors cannot be applied in the case of slipring motors for the reason that the drive in the form of a slipring motor is merely controlled, but is not regulated. A forward and backward movement or shaking of the caking in the mill as applied in the known method is therefore not possible using standard drives, i.e. slipring motors.

SUMMARY OF THE INVENTION

The object of the present invention is to improve a drive system for a ball mill which is driven by a slipring motor and to specify an improved method for operating such a ball mill.

In respect of the drive system, the object is achieved by means of a drive system for a ball mill which is driven by a slipring motor. In this context, a family of characteristics is assigned to the motor or to the complete system comprising motor and mill. The family of characteristics relates the torque of the motor to a further characteristic variable of the motor via a characteristic. According to the invention, the family of characteristics has at least two different characteristics. The drive system also has a switching element which switches the drive system abruptly between both characteristics when the characteristic variable has a constant value.

The characteristics describe a relevant relationship between the torque and a further characteristic variable, e.g. the rotational speed of the motor. If a switch from one characteristic to the other now occurs as a result of a constant value of this characteristic variable, e.g. a constant rotational speed, a torque jump at the motor and/or at the drum of the ball mill also occurs as a result of the switching. This occurs because the characteristics—at least at the point of switching—are not congruent and therefore differ in torque for the same value of the characteristic variable. The characteristic jump therefore produces a torque jolt at the drum of the ball mill in the system comprising mill, motor and power supply. The switching occurs in the event of a suitable load and/or rotational position of the drum of the ball mill, and therefore in the event of a suitable rotational or inclined position of the caking. The caking can therefore be shaken loose from the drum of the ball mill, as in the case of the known method for mills featuring a ring motor. The torque jolt therefore causes the drum of the mill to shake, such that the caking is detached, this being caused by a sudden jump between two characteristics of the slipring motor, and the mill charge is therefore churned up.

According to the invention, this is achieved by simply switching between two characteristics in a family of characteristics of the motor. The addition of expensive controllers or regulators to the ball mill is therefore unnecessary, and it is merely required to integrate the inventive switching element which acts on the characteristics into the drive system of the mill, usually in conjunction with a parallel resistor. Moreover, it is correspondingly only necessary to implement two characteristics in the family of characteristics, whose respective torques differ as markedly as possible when the characteristic variable is constant, in order to effect the above cited torque jump when the characteristic is switched. Time-intensive rinsing of the ball mill and mechanical intervention in the caking in order to detach it are no longer necessary. It is anticipated that the caking can be detached in this way in approximately 80% of cases.

As mentioned above, in a preferred embodiment of the drive system, the further characteristic variable is the rotational speed of the motor. Families of characteristics which relate rotational speed and torque of a slipring motor of a ball mill are particularly common.

The drive system usually features a supply line which leads to the motor and feeds a drive current to the motor. In a preferred embodiment, a resistor which determines the characteristics of the motor is connected into the supply line, i.e. normally between the motor and a rotor starting resistor. The switching element is therefore a switching element which abruptly changes the resistor or the ohmic resistance value thereof. A switching element which abruptly changes a resistor or resistance value is particularly easy to implement, e.g. in the form of power contactors and switchable fixed resistors. It is particularly easy to change the characteristic in the family of characteristics of a motor by changing the resistance value in the supply line.

A starting resistor is usually connected into the supply line to the motor or rotor as a resistance in any case. Said starting resistor is usually variable and embodied in the form of a liquid starter with short-circuit protection, for example. It allows the mill to be started using various resistance values and/or characteristics. A short-circuit protection for bridging the starting resistor ensures that this is short-circuited during normal operation of the ball mill, i.e. after the initialization or startup, and is therefore no longer loaded. In other words, the starting resistor is bypassed and the motor is then directly connected to the power supply. Such a starting resistor is variable but not abruptly variable, and therefore the inventive drive system and/or method cannot be realized solely by utilizing the starting resistor or the variation thereof. Although a torque variation can be realized in this way, it is not possible thereby to realize an abrupt torque change or torque jolt.

In a preferred variant of the above cited embodiment, the switching element is then connected in series with the above cited resistor. Here, the switching element is connected in parallel with a supplementary resistor, acting as a short-circuit switch to shunt the supplementary resistor if applicable. It is therefore particularly simple to separate the supply line to the motor in series with the starting resistor, and insert the switching element and the supplementary resistor here. The switching element is therefore embodied in a particularly simple manner as a short-circuit switch which shunts the parallel-connected supplementary resistor. Therefore only the standard starting resistor in the ball mill is enabled when the short-circuit switch is closed. As a result of opening the short-circuit switch, the supplementary resistor is instantaneously switched into the supply line such that the total resistance in the supply line changes abruptly and therefore the characteristic in the family of characteristics also changes abruptly relative to the starting characteristic or the starting family of characteristics, or a characteristic is selected which again differs markedly therefrom. In other words, the switching in of a supplementary resistor between rotor and liquid starter results in a sudden jump to a different e.g. "longer" characteristic and hence a reduction in torque.

In a further preferred embodiment, the drive system includes a control and analysis unit which is designed such that it can recognize caking in the ball mill and actuates the switching element as a function of the recognition of caking. In other words, it is possible by means of the control and analysis unit to realize automatic recognition of the presence of caking, automatic actuation of the switching element, and therefore automatic detachment of the caking by jiggling the drum of the ball mill.

In a preferred variant of this embodiment, the control and analysis unit recognizes caking by capturing an angle of rotation of the drum of the ball mill and a drive current which feeds the motor. Particularly at a known angle of rotation, in the event of caking, the drive current deviates significantly from the drive current of a ball mill which is running normally, and therefore such detection of caking can be effected with particular ease.

In other words, two components are added to a conventional ball mill, namely a short-circuitable supplementary resistor in the supply line and a corresponding intelligent control unit which can detect caking from e.g. an angle and current that have been captured, and can trigger the detachment of the caking.

In respect of the method, the object of the invention is achieved by a method as claimed in claim 7 for operating a ball mill which is equipped with a drive system as cited above. According to the invention, the drum of the ball mill is moved from its state of rest when the first characteristic is used or activated. This characteristic is usually the normal operating characteristic or a family of starting characteristics of the drive system or of the ball mill. During the startup of the ball mill, a check is performed to establish whether caking is present. If caking is present, the drum of the ball mill is moved or rotated from the position of rest until such time as the caking, which is initially in state of rest (namely a horizontal profile of the caking), is situated at an inclined position of e.g. 45°. At such an inclined position, the material to be ground (including the grinding medium) would normally (i.e. if no caking was present) already move in the interior of the ball mill, i.e. roll downwards in the direction of gravity. At such an inclined position, the switching element is then actuated in order to switch the motor to the second characteristic. The torque at the drum of the ball mill changes abruptly as a result of this, such that both drum and caking experience a torque jolt, whereby the caking is generally detached.

In a preferred embodiment of the method, in a relevant inclined position of the caking, provision is made for switching repeatedly between the characteristics by actuating the switching element. This results in not just one single torque jolt, but a jiggling operation at the drum of the ball mill at the same or different inclined positions of the caking. In other words, the switching element is therefore operated in such a way that, by opening and closing e.g. the above cited short-circuit switch, an operating mode is activated which jiggles the drum of the ball mill.

In a further preferred embodiment of the method, caking is monitored by means of a control and analysis unit, and switching between the characteristics is automatically effected by actuating the switching element if caking is found. In other words, as explained above, provision is made here for fully automatic recognition of the presence of caking when a ball mill is started up, and fully automatic detachment of the caking by a jiggling operation of the drum of the ball mill, for example.

The drive system according to the invention is especially preferably used for grinding ores. It is also suitable for mass mills, for example, which are used to produce slips.

BRIEF DESCRIPTION OF THE DRAWING

For a further description of the invention, reference is made to the exemplary embodiments in the drawing, this comprising schematic diagrams in which:

FIG. 5 shows the ball mill from FIG. 1 following a first torque jolt.

DETAILED DESCRIPTION OF PREFERRED EMBODIMENTS

Figure 1:
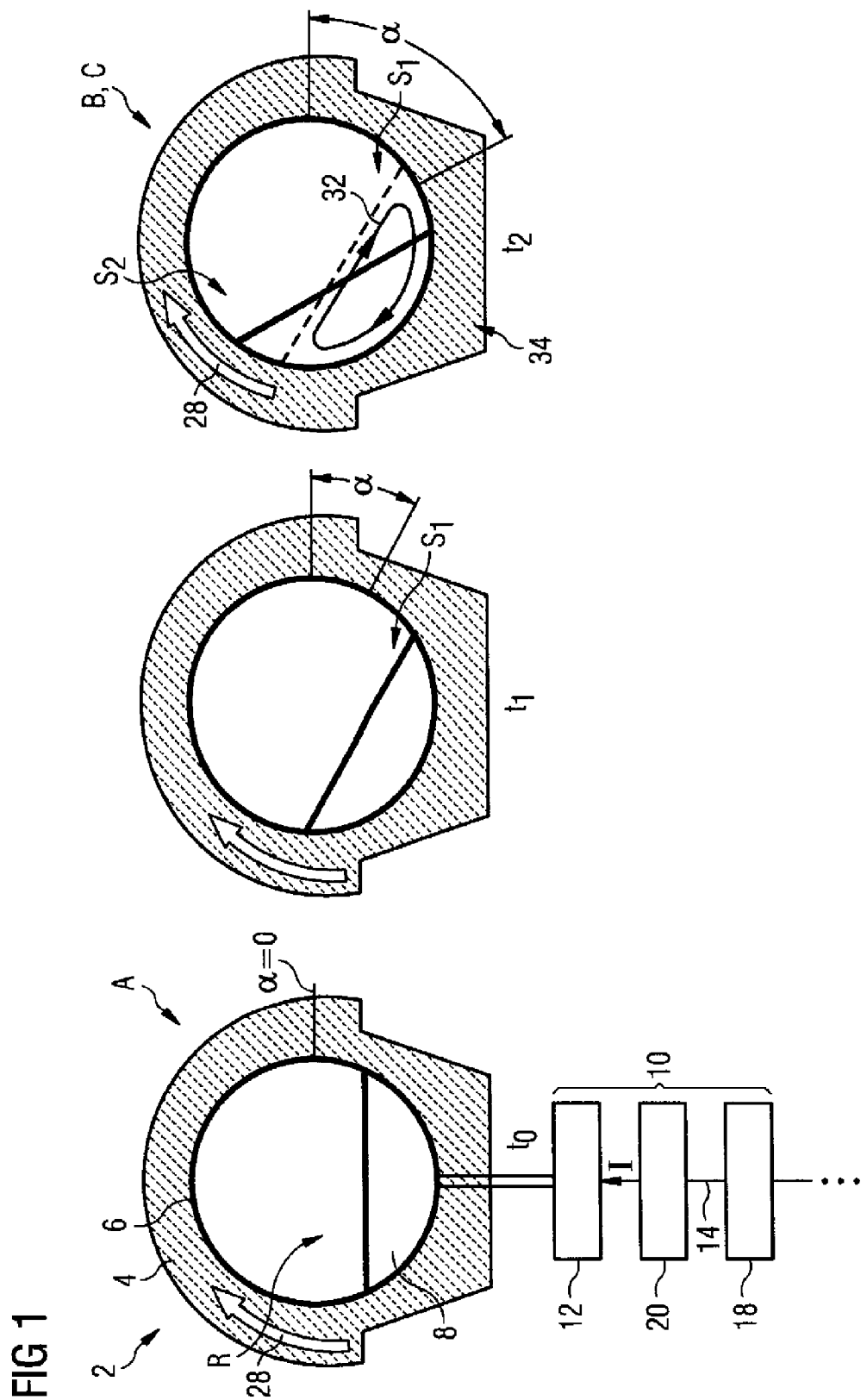
FIG. 1 shows an inventive ball mill with caking during the startup.

FIG. 1 shows a ball mill 2, which essentially comprises a housing 4 and a drum 6 that is rotatably mounted therein. Situated in the interior of the drum 6 is material to be ground, taking the form of ore 8 here. Grinding medium is normally added to the grinding stock, but is not illustrated separately here. In the following, use of the term ore therefore notionally includes any grinding medium that may be present. The ball mill 2 has a drive system 10, which includes a motor 12 that drives the drum 6. Said motor 12 is connected to a power supply 16 (see FIG. 2) via a supply line 14. The drive current I of the motor 12 flows through the supply line. The drive system 10 further comprises a resistor 18, which is connected into the supply line 14 and takes the form of a starting resistor, and a switching element 20 which is connected into the supply line 14 in series with said resistor 18.

Figure 2:
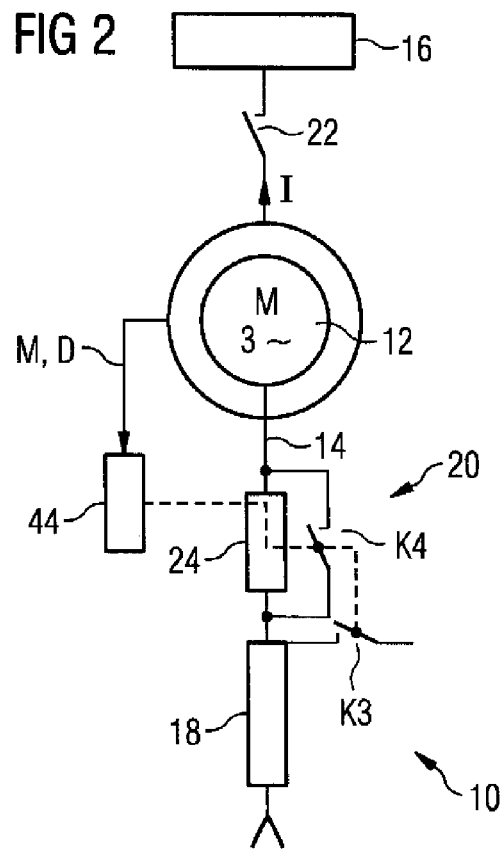
FIG. 2 shows the drive system of the ball mill from FIG. 1.

FIG. 2 shows the drive system 10 from FIG. 1 in greater detail, including the motor 12 and the resistor 18, which is switched into the supply line 14 and embodied as a variable resistor, i.e. a liquid starter. The resistor 18 also has a short-circuit protection K3, which is used to shunt the resistor 18 to the rotor circuit, i.e. disable it in the supply line 14. The motor 12 is also assigned a main switch 22 for switching the entire ball mill 2 on or off. The structure explained thus far in FIG. 2 is that of a conventional known ball mill 2.

According to the invention, a supplementary resistor 24 is now switched into the supply line 14 as a switching element 20 in the drive system 10, and a further short-circuit protection K4 is connected in parallel therewith in order to shunt the supplementary resistor 24 and thus deactivate it. In other words, the switching element 20 provides the inventive jiggling or shaking functionality for the drum 6 of the ball mill 2. This occurs because the variation of the total resistance value in the supply line 14 changes the torque/rotational speed characteristic of the motor 12. The supplementary resistor 24 here is so dimensioned that both characteristics differ markedly in respect of the torque at a given rotational speed, at least at one working point. It is possible to jump between the two characteristics by opening or closing the short-circuit protection K4.

Figure 3:
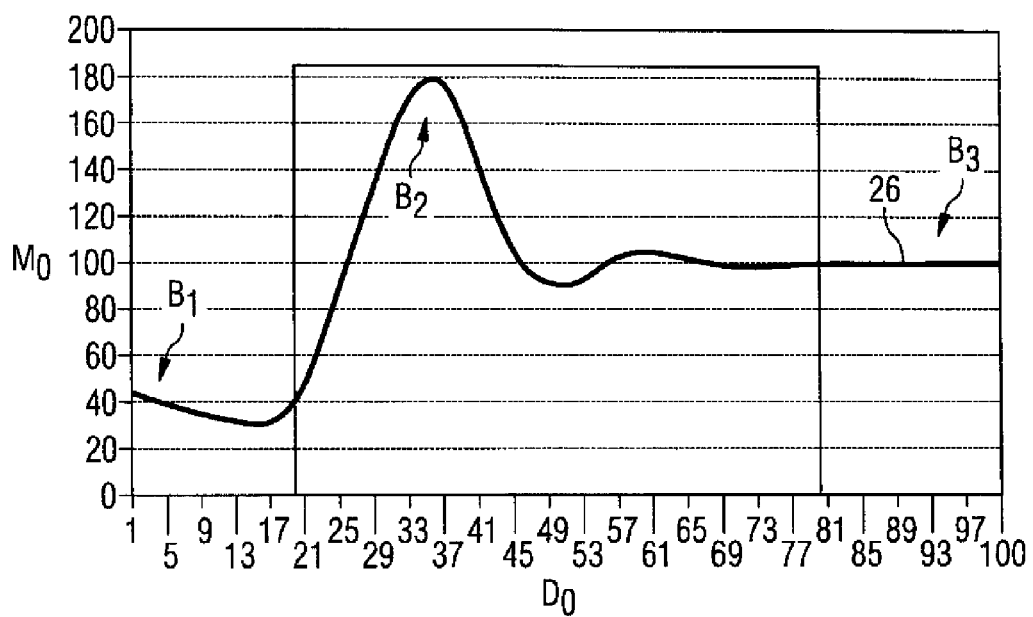
FIG. 3 shows a startup curve between torque and rotational speed for a ball mill without caking.

FIG. 3 shows the so-called initialization curve 26 of the ball mill 2 for undisturbed operation, i.e. without any caking in the drum 6 of the ball mill 2. The torque M occurring at the drum 6 or at the motor 12 is plotted on the Y-axis as a percentage of a nominal torque $M_0$ when the mill 2 is working normally. This torque occurs at a nominal rotational speed $D_0$. The rotational speed D relative to the nominal rotational speed $D_0$ of the motor 12 of 100 percent is plotted on the X-axis. A region B3 of the initialization curve 26 therefore shows the normal operation of the ball mill 2 at approximately nominal rotational speed $D_0$ and nominal torque $M_0$. By contrast, a region B1 shows the starting torque of the motor 12 as being approximately 40% of $M_0$ when the ball mill 2 is initialized from a standstill. The region B2 also shows a torque peak which, as indicated by the lines, can occur in the region between 20 and 80 percent of the nominal rotational speed D, depending on the start time of the ball mill 2.

FIG. 1 now shows a starting routine of the ball mill, wherein the drum 6 is stationary at a first time point t0 and therefore the ore 8 is situated in a horizontal position or position of rest R, e.g. following a lengthy standstill of the mill. At the time point t0, the drive system 10 is activated by closing the main switch 22. The short-circuit protection K3 is closed, and therefore the resistor 18 is disabled. The short-circuit protection K4 is open, and therefore the supplementary resistor 24 is enabled. The drum 6 now begins to rotate in the direction of the arrow 28, such that the ore 8 moves from its horizontal position of rest R to a first inclined position S1 at the time point t1. The angle of rotation of the drum 6 is specified by the angle α, e.g. relative to the horizontal. The ore 8 here has not yet moved relative to the drum 6 due to internal static friction.

FIG. 1 also shows the ball mill 2 at an even later time point t2 with a further steeper inclined position S2 of the ore 8. The inclined position S2 is produced solely due to caking 34 of the ore 8 in the drum 6. This means that the ore 8 has likewise not yet moved relative to the drum 6 at the time point t2. Without this corresponding caking, the ore 8 would still only be the inclined position S1 at the time point t2, as indicated by a broken line 30, wherein constant rolling of the ore 8 in the direction of the arrow 32 would have begun here in the meanwhile and the ore 8 would now be continuously turned over and therefore ground.

Figure 4:
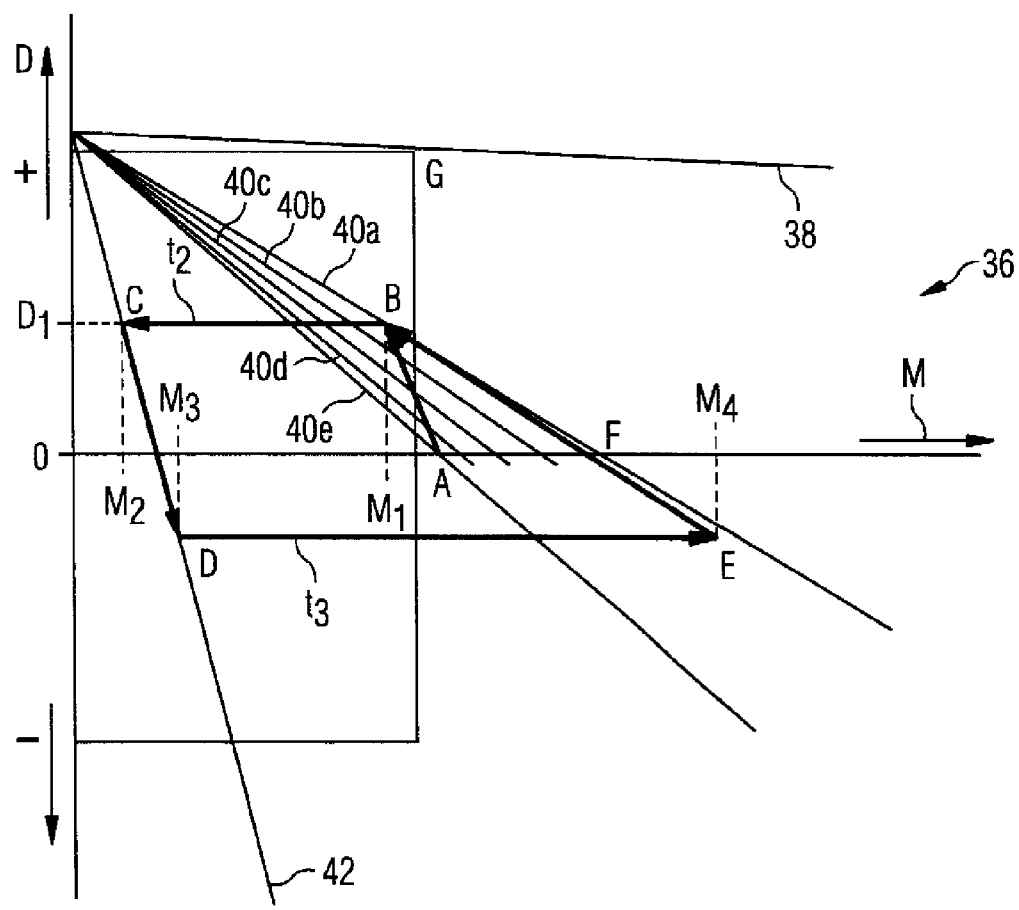
FIG. 4 shows a family of characteristics of the ball mill from FIG. 1.

FIG. 4 shows a family of characteristics 36 of the motor 12, wherein the torque or moment M is plotted on the X-axis and the rotational speed D of the motor 12 is plotted on the Y-axis. Visible is a so-called 0 k characteristic 38, which applies when both of the short-circuit protections K3,4 are closed. This therefore represents the basic motor characteristic without resistors in the supply line 14. Also visible in the form of a family of characteristics are characteristics 40a-e, which apply when short-circuit protection K3 is open and short-circuit protection K4 is closed. The different characteristics 40a-e are characteristics for various resistance values of the variable starting resistor 18. These are used to start up the ball mill 2. The characteristic 40a is a 0.7 k characteristic, and the characteristic 40e is a 0.9 k characteristic.

Also visible is a 3 k characteristic 42, which applies when both short-circuit protections K3,4 are open, i.e. both the starting resistor 18 and the supplementary resistor 24 in the supply line 14 are enabled.

FIG. 4 also shows various operating states A to G of the ball mill 2 at corresponding working points in the family of characteristics 36.

The operation of the ball mill 2 begins in the operating state A, in which the short-circuit protection K4 is closed and the short-circuit protection K3 is open. The starting resistor 18 is adjusted in respect of its resistance value such that the characteristic 40e is active. As in the case of the normal starting routine, the resistor 18 is varied during the subsequent transition to the operating state B, such that the characteristics 40d to 40a apply in turn and the ball mill 2 ultimately arrives at the operating state B, in which the above cited caking 34 is recognized at the time point t2.

For this reason, the inventive method is now applied and the short-circuit protection K4 is opened. Practically without any time delay, i.e. at the time point t2, the ball mill 2 therefore arrives at the operating state C due to the abrupt switch to the 3 k characteristic 42. A torque jump therefore occurs from the torque M1 to the weaker torque M2 at the rotational speed D1 of the motor 12 at that instant. Consequently, the drum 6 also experiences a reduction in torque. Due to the significantly weaker torque M2, the ball mill 2 ceases its rotation in the direction of the arrow 28, comes to a standstill and rotates in an opposite direction to that of the arrow 28 until it has returned to the rotational position shown in FIG. 5 at the time point t3. FIG. 5 therefore shows the operating state D at the time point t3. According to the invention, the short-circuit protection K4 is now closed again, thereby instantaneously effecting a jump back to the characteristic 40a and the operating point E as per FIG. 4. The torque instantaneously jumps from the value M3 to the value M4, whereupon the drum 6 of the ball mill 2 and in particular the ore 8 in the drum 6 experiences a torque jolt and therefore the ore 8 works itself loose. The drum 6 of the ball mill 2 now ceases its rotation against the direction of the arrow 28 due to the significant increase in torque, comes to a standstill and then rotates in the direction of the arrow 28 again until it reaches the operating state B again at the time point Tt. As shown in FIG. 5, the caking 34 is not yet detached and therefore provision is made for passing through the operating states B, C, D, E once again. At a correspondingly later time point, the ball mill 2 then returns from the operating state E to the operating state B as per FIG. 5. FIG. 5 indicates by means of a broken line here that the ore 8 has become completely detached from the drum 6 in the meanwhile and the caking 34 has therefore disappeared. The rolling operation marked by the broken line now begins as indicated by the arrow 32 at the inclined position S1 of the ore. The starting state of the ball mill 2 is now finished, and therefore the resistor 18 is finally disabled by closing the short-circuit switch K3. The ball mill 2 now arrives at the operating state G, i.e. normal operation.

In a variant of the invention, the drive system 10 as per FIG. 1 also comprises a control and analysis unit 44, which captures both an angle of rotation a and the drive current I of the motor 12, detects caking 34 on this basis, and actuates the short-circuit protections K3 and K4 as described above in order to perform the method cited above automatically.

Instead of ore, the mill can obviously be loaded with other grinding stock which tends to cake onto the inner wall of the drum. Moreover, any mill that is driven by a motor with a slipring rotor and features a rotating drum in which caking forms can in principle be used in conjunction with the drive system according to the invention.

The invention claimed is:

1. A ball mill, comprising:
a drive system comprising a motor having a slipring rotor, wherein the motor is assigned at least two different characteristics relating a torque of the motor to a rotational speed of the motor, a switching element configured to switch the drive system abruptly between the at least two different characteristics when the rotational speed has a constant value, and a control and analysis unit capable of recognizing caking in a drum of the ball mill and actuating the switching element as a function of a recognition of caking.

2. The ball mill of claim 1, further comprising a supply line leading to the motor and feeding the motor with a drive current, and a resistor adapted to determine the characteristics and connected into the supply line, said switching element configured to abruptly change a value of the resistor.

3. The ball mill of claim 2, wherein the resistor comprises a starting resistor connected in series with a supplementary resistor into the supply line, said switching element being connected in parallel with the supplementary resistor and shunting it in a manner of a short-circuit switch.

4. The ball mill of claim 1, wherein the control and analysis unit recognizes the caking by ascertaining an angle of rotation of the drum of the ball mill and a drive current which feeds the motor.

5. A method for operating a ball mill, comprising:
moving a drum of the ball mill out of a state of rest by a drive system as set forth in claim 1, when a first characteristic is activated;
in the event of caking in the drum of the ball mill, rotating the drum until the caking assumes an inclined position; and
actuating a switching element to switch to a second characteristic.

6. The method of claim 5, further comprising actuating the switching element to repeatedly switch between the characteristics when the caking assumes the inclined position.

7. The method of claim 5, further comprising monitoring caking in the drum by a control and analysis unit, and automatically switching between the characteristics by actuating the switching element when caking is detected.

8. The method of claim 5, further comprising feeding a motor of the drive system with a drive current, disposing a resistor in a supply line leading to the motor to determine the characteristics, and configuring the switching element to abruptly change a value of the resistor.

9. The method of claim 8, further comprising connecting a starting resistor of the resistor in series with a supplementary resistor into the supply line, and connecting the switching element in parallel with the supplementary resistor and shunting it in a manner of a short-circuit switch.

10. The method of claim 8, further comprising recognizing the caking by ascertaining an angle of rotation of the drum of the ball mill and a drive current which feeds the motor.

* * * * *